May 29, 1956 A. H. GROSS 2,747,483
LEVEL CONTROL FOR TRACTOR-DRAWN IMPLEMENTS
Filed Aug. 6, 1953 2 Sheets-Sheet 1
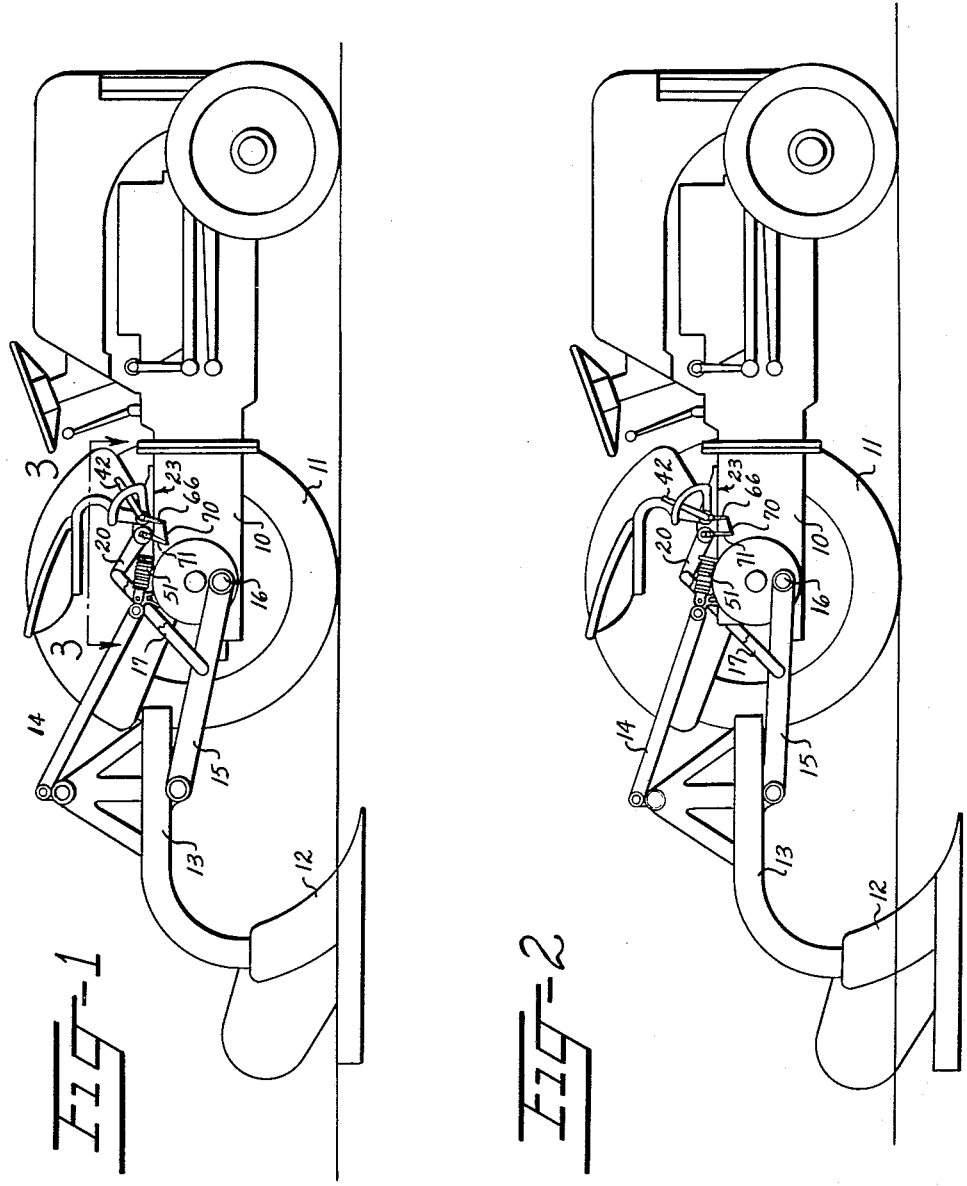
INVENTOR:
ARTHUR H. GROSS.
BY Eaton + Bell
ATTORNEYS.

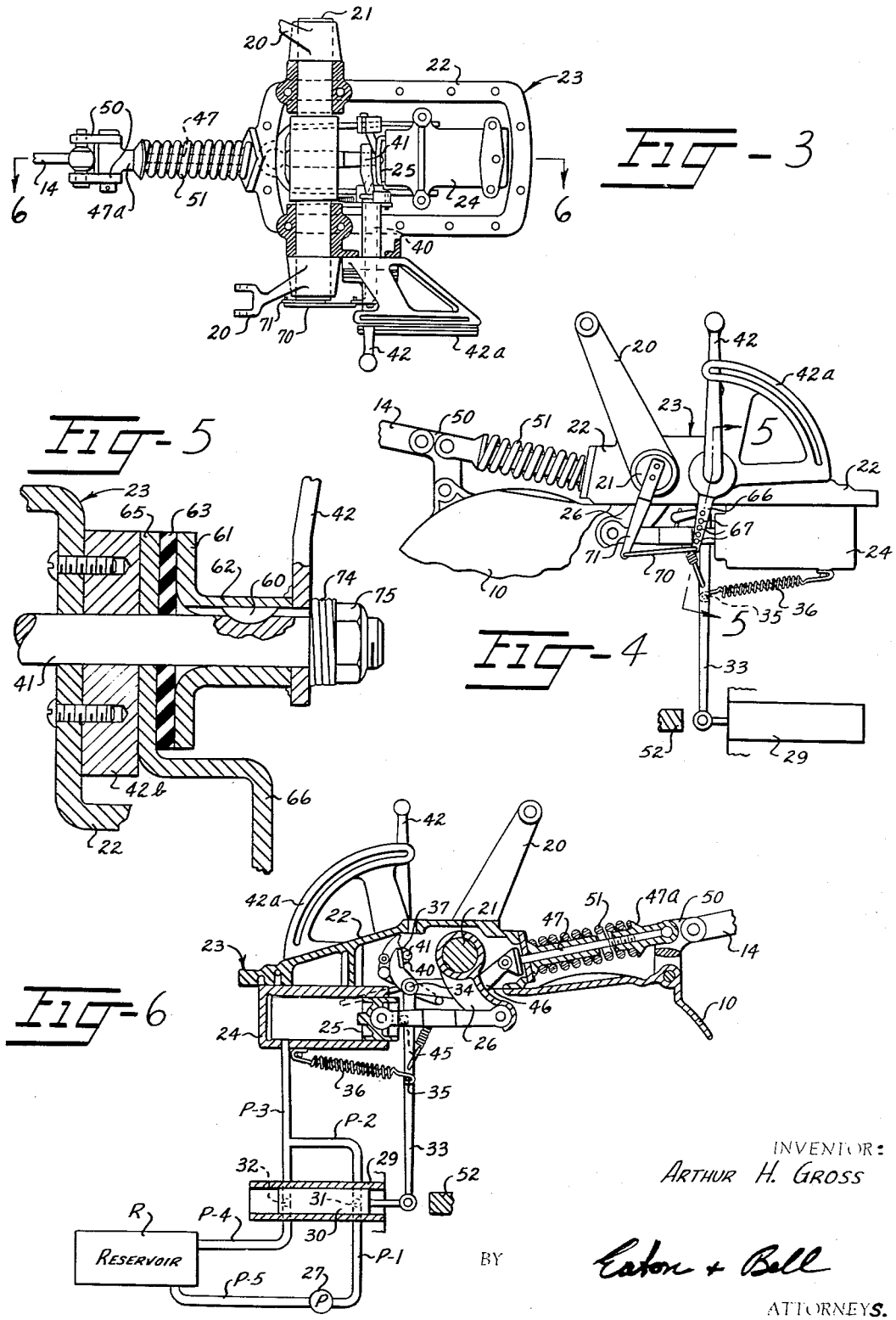

United States Patent Office 2,747,483
Patented May 29, 1956

2,747,483

LEVEL CONTROL FOR TRACTOR-DRAWN IMPLEMENTS

Arthur H. Gross, Forest City, N. C.

Application August 6, 1953, Serial No. 372,749

2 Claims. (Cl. 97—46.07)

This invention relates to tractor-drawn agricultural implements and, more especially to an improved apparatus for controlling the usual tractor fluid power-operating control unit of a tractor in response to variations in the level of the implement.

It is well known that many farm tractors are provided with liftable and lowerable implement carriers together with means for automatically maintaining the implement at constant depth or at a predetermined level, one form of such means being disclosed in U. S. Patent No. Re. 22,642, issued to Henry G. Ferguson on May 15, 1945. Such control units as that disclosed in said patent are provided with a manual control lever which the operator moves to a predetermined position for admitting fluid under pressure to the ram thereof so the pressure in the ram will support the implement on a corresponding predetermined level.

Now, as is well known in the art, many soil-working implements, such as plows, cultivators and the like have a pointed front end which tapers upwardly, outwardly and rearwardly from the pointed end thereof and, due to constant variations in texture and density of the soil through which such implements are drawn, it is necessary for the operator to continuously vary the position of the manual control lever to, in turn, continuously vary the amount of pressure transmitted to the ram of such control units as above described in order to maintain the plow at a uniform depth.

By way of explanation, it is to be assumed that the operator originally positions the control unit manual control lever so the plow is supported by the tractor at an optimum depth for working soil of normal texture or density. Since the fluid pressure in the control unit then supports substantially all of the weight of the plow, and the remaining weight of the plow is supported by the soil, as the plow subsequently approaches relatively hard or dense soil it often happens that the plow is not of sufficient weight to cause the same to penetrate the denser soil and the plow tends to ride over the soil and is elevated thereby. In order to obviate the raising of the plow by the relatively dense soil, the operator moves the control lever so that less of the weight of the plow is supported by the fluid pressure in the control unit and the additional weight of the plow causes the same to penetrate the relatively hard or dense soil.

However, upon subsequently approaching relatively soft or loose soil, the added weight of the implement is such that it penetrates the soil at too great a depth, since the relatively soft or loose soil tends to force the plow downwardly below the level at which the plow would normally be supported by the amount of fluid in the ram of the control unit. Of course, as the soil tends to induce greater draft in the plow, here again it is necessary for the operator to regulate the control lever of the control unit to momentarily admit additional fluid under pressure to the ram thereof until the plow has again been raised so that it forms a furrow of the desired depth. It is, therefore, evident that it is necessary for the operator to continuously move the control lever for the fluid pressure control unit in first one direction and then the other in order to plow a furrow of even depth when a conventional unit is used.

It is, therefore, the primary object of this invention to provide a simple and effective means for automatically controlling flow of the level of the fluid under pressure to and from the ram of the control unit whenever the implement is varied by any means other than the control unit itself, such as by engaging soil of varying density during the course of its movement through the soil, so that the implement may immediately return to its normal or optimum level upon moving out of engagement with soil of greater than normal or less than normal density.

More specifically, it is an object of this invention to provide an automatic depth control arm which is oscillatably connected with the usual manual control lever of a control unit of the character described, which arm is connected by suitable linkage to the plow attached to the tractor. Means are provided whereby the manual control lever may override said arm in the course of manual adjustment thereof to the desired position, but, on the other hand, when the implement is raised, or lowered by variations in the density of the soil, in the manner above set forth, the plow imparts corresponding movement to said arm and the manual control lever to move the control valve of the control unit to vary the amount of fluid controlling the position of the ram, causing the plow to quickly return to its original or optimum position. Of course, since the automatic depth control arm is mecheanically connected with the plow or implement, the arm and the manual control lever move in unison and the manual control lever is returned to the position to which it was originally adjusted by the operator, so the implement is supported in the optimum position.

Some of the objects of the invention having been stated, other objects will appear as the description proceeds when taken in connection with the accompanying drawings, in which—

Figure 1 is a side elevation of a tractor with a plow attached and controlled by a fluid pressure control unit, and showing the improved attachment for operating the control unit in response to variations in the level of the plow;

Figure 2 is a view similar to Figure 1, but, showing the plow as though lowered excessively and showing the improved attachment in a different position;

Figure 3 is an enlarged plan view, partially in section, of the hydraulic raising and lowering and depth control unit looking substantially along line 3—3 in Figure 1 and showing the improved attachment in association therewith;

Figure 4 is an elevation looking up at the lower side of Figure 3 and showing portions of the tractor frame in association therewith, but being broken away for purposes of clarity;

Figure 5 is an enlarged fragmentary sectional view taken substantially along line 5—5 in Figure 4, showing the manner in which the improved depth control arm is operatively connected with the manual control lever, and showing the slip clutch means permitting the manual control lever to override said control arm;

Figure 6 is a longitudinal vertical sectional view through the hydraulic raising and lowering and depth control unit taken substantially along line 6—6 in Figure 3.

Referring to Figures 1 and 2 of the drawings, the tractor illustrated is of the Ford-Ferguson type embodying the Ferguson linkage and implement system. However, it is to be understood that the present invention may be used with any type of tractor having a fluid pressure control unit for controlling the position or level of any type of soil-working or agricultural implement.

The tractor comprises a body casing or frame 10 and the usual two rear ground wheels 11, the nearer wheel being omitted for purpose of clarity. A suitable soil-working or agricultural implement, such as, for example, a plow 12, is connected to the rear end of a beam moldboard, which is pivotally connected to the rear ends of upper and lower substantially parallel links 14 and 15. The front end of the upper link 14, which serves as a compression link, is connected to the fluid-power control unit, as will be described later, and the front end of lower links 15, only one of which is shown, are pivoted at 16 to the casing 10. The lower ends of drop links 17 are pivotally connected to the medial portions of the lower links 15. The upper ends of the drop links 17 are pivotally connected to laterally spaced lifting arms 20 which thus serve to raise and lower the plow 12 with a substantially parallel motion.

In Figure 3, it will be observed that the lifting arms 20 are fixed on opposite ends of a rock shaft 21 journaled in a casing 22 of a fluid-power unit broadly designated at 23. The fluid-power unit 23 or power-operated depth control unit 23 may be of any desired or conventional type. Therefore, only so much of the control unit 23 will be described as is necessary to a clear understanding of the present invention.

The fluid-power depth control unit includes a hydraulic ram or oil ram consisting of a cylinder 24 connected to an oil pump or hydraulic pressure source 27 and having a piston 25 connected to an operating lever 26. The pump 27 is controlled by a valve 30 movable in a housing 29 and being adapted to control an inlet port 31 in housing 29, on the suction side of the pump, and an outlet port 32 in housing 29. When port 31 is uncovered, communication is established between conduits or pipes P–1 and P–2 and, when port 32 is uncovered, communication is established between fluid return pipes P–3 and P–4. Pipe P–3 is connected to one end of cylinder 24 and the end of pipe P–4 opposite from housing 29 is connected to a fluid reservoir R.

The ends of pipes P–1 and P–2 remote from housing 29 are connected to pump 27 and pipe P–4, respectively. A pipe P–5 connects the pump 27 and reservoir R. The fluid control mechanism including pipes P–1 to P–5, inclusive, valve 30, housing 29, reservoir R and pump 27 are shown schematically, since their arrangement does not constitute part of the present invention.

The valve 30 is connected to a lever 33 of duplex form which is pivoted at 34, engaged at 35 by a tension spring 36, and has its upper end 37 normally kept by said spring against an eccentric or cranked part 40 of a control shaft 41 on which a manual control lever 42 is mounted in a manner to be later described. The lever 42 is movable adjacent a quadrant 42a, having a hub 42b fixed to one side of casing 22. The pivot 34 and the crank 40 are movable and, thus, the lever 33 may be described as a "floating" lever. The operating lever 26 is fixed on the medial portion of the rocker shaft 21, on opposite ends of which the lifting arms 20 are fixedly mounted.

The lever 33 is of duplex form and has two inward projections, only one of which is shown and indicated at 45 in the annexed drawings, and which can act as fulcrum means.

Figures 4 and 6 show the mechanism in a position corresponding to the implement or plow 12 having been raised, there being no compression in the link 14 and the valve 30 covering both ports 31 and 32. The mechanism heretofore described operates in a conventional manner, however, a description of the operation of the mechanism thus far described will now be given in order that the operation of the present invention may be clearly understood.

To lower the implement 12 to working position, the manual lever 42 is moved forwardly and downwardly, in a clockwise direction in Figure 4, or in counter-clockwise direction in Figure 6 to substantially the position shown in Figure 1. Thereupon, the eccentric 40 rotates the valve operating lever 33 counter-clockwise (Figure 6) about the pivot 34 and moves the valve 30 to the right so that drop-port or outlet port 32 is uncovered and allows oil or fluid to leave the cylinder 24. The ram piston 25 then moves inwardly and the implement sinks under its own weight until it reaches the required depth.

When this occurs, the consequent compression in the link 14, due to the soil or draft pressure on the implement, compresses a balance spring 51 to a predetermined extent such that the pivot 34 is so moved to the left (Figure 6) under the influence of spring 36 that the lever 33 rotates about its point of contact with eccentric 40 in a clockwise direction and brings the valve 30 back to the position shown in Figure 6 and movement of oil or fluid ceases. Thereupon, the implement or plow 12, while in engagement with soil of a substantially uniform density, carries on working at the predetermined depth.

When the lever 42 is returned to the left position shown in Figures 4 and 6, the lever 33 is rotated clockwise about the pivot 34 under the action of tension spring 14 and causes the valve 30 to uncover the suction port 31 so that oil or fluid is pumped into the cylinder 24 and the implement is raised until the ram 25 engages the projections 45 and moves the lever 33 back to the position shown in Figure 6.

Automatic depth control during operation is effected, to an extent, by raising or lowering the plow respectively as the implement goes too deep or too shallow and the draft or soil pressure increases or decreases. Now, the automatic depth control mechanism, including the intervening parts between the compression link 14 and the lever 33 has proved inefficient, primarily, due to the amount of pressure required in the compression or balance spring 51, which would retard the operation of the automatic depth control to such an extent that, heretofore, it has been necessary for the operator to continuously vary the position of the manual lever 42, although the manual lever 42 has originally been positioned at an optimum position to cause the plow or implement 12 to make the depth of cut required.

The operation of the automatic depth control thus far described is in response to the swinging movement of the lever 33 about the engagement of its upper end 37 with crank 40 as a center produced by the shifting of the pivot 34 either to the left or the right by the corresponding movement of the rod 47. Such swinging movement of the lever 33 respectively opens the port 31 or 32 and causes the implement to be raised or lowered. This correction, through the corresponding correction in the soil pressure on the implement, normally returns the pivot 34 to its normal balanced position with both ports 31 and 32 closed.

When the implement strikes an obstruction, such as a rock or root, the balance spring 51 is abnormally compressed and an excess movement beyond the normal range is imparted to the rod 47 and the associated draft-transmitting mechanism. The pivot 34 is moved to the left until the projections 45 engage the end of the cylinder 24 and the lever 33 is caused to rotate counter-clockwise; the projections 45 acting as the fulcrum, until it engages a stop 52. It will be noted that the top 37 of the lever 33 has then left the crank 40 and the oil or fluid then leaves the cylinder 24 through the port 32 and the weight of the implement is no longer borne by the fluid in the cylinder 24.

Now, it has been found that the slight movement imparted to the pivot 34 by corresponding movements of the rod 47, as the implement or plow 12 goes too deep or too shallow and the draft or soil pressure increases or decreases, does not impart sufficient movement to the valve 30 to fully open the respective ports 31 or 32 to cause the implement to be raised or lowered to the correct depth, particularly in view of the fact that the compression spring 51 must be compressed when the implement is elevated above the desired depth in order to move the pivot 34 to the left in Figure 6. Also, the pivotal connections between the links 14 and 15 and the tongue 13 of the plow or implement 12, as well as the pivotal connections between said links and the duplex crank 50 and the tractor casing 10, respectively, must be of minimum relatively close tolerances between the mating parts and, as they become worn, the efficiency of the control apparatus, as thus far described, is correspondingly reduced.

For example, it has been found that, in order to cause the plow or implement 12 to go into the soil the proper depth upon approaching particularly dense or hard soil, after the position thereof has been properly adjusted for soil of a normal density, it is necessary that additional oil or fluid be released from the cylinder 24 so that a lesser amount of the weight of the implement or plow 12 is supported by the tractor; that is, by the fluid in the cylinder 24, since, otherwise, the implement will merely be raised by the relatively hard or dense soil and, although this reduces the effective pressure of the fluid in the cylinder 24, the weight of the implement is such that it will move downwardly relatively slowly or will merely pass over and ride upon the relatively firm, hard or dense soil.

Therefore, in order to cause the plow 12 to be maintained at the proper depth, it has heretofore been necessary for the operator to manually lower the lever 42 so as to permit more of the weight of the plow 12 to rest upon the soil and to thereby penetrate the soil to the desired depth.

However, upon the plow 12 subsequently approaching relatively soft or loose soil, the added weight of the implement would be such that it would penetrate the soil at too great a depth. This would occur although the piston 30 (Figure 6) would be closing both of the ports 31 and 32, since the amount of fluid in the cylinder 24 would be less than would normally be required in order to support the implement or plow 12 at the required depth.

In this instance, the compression link 14 and associated parts would be ineffective to control the depth of the implement or plow because of their sluggish or tardy response and, as a matter of fact, the compression link 14 would merely pivot at opposite ends thereof on the duplex crank 50 carried by the tractor and on the implement, respectively. Therefore, it would again be necessary for the operator to move the manual lever 42 upwardly, opening the port 31, to momentarily introduce additional fluid or oil into the cylinder 24, to raise the implement or plow 12 to the required level.

Now, in order to cause the valve 30 to respond quickly to the slightest variation in the level of the plow or implement 12, after the plow or implement 12 has originally been adjusted to a position corresponding to the depth of cut required, I have provided an improved automatic depth control apparatus embodying means for imparting movement to the manual lever 42, the shaft 41 and its cranked part or eccentric 40 in unison with variations in the position or level of the implement or plow 12 to, accordingly, vary the position of the valve 30, and which means is so arranged as to permit manual movement of the manual lever 42 independently of the implement or plow 12 to facilitate originally moving the manual lever 42 to a position corresponding to the depth of cut required.

To this end, it will be observed in Figures 4 and 5 that the manual lever 42 is keyed on the outer end of the shaft 41, as at 60 to thereby permit slight axial movement of the manual lever 42 on the shaft 41. The manual lever 42 has a rigid disk 61 which may be formed integral therewith and which, in the present instance, has a tubular portion 62 integral therewith and whose end opposite from the disk 61 is suitably secured to the manual lever 42, as by welding, or the tubular portion 62 may be integral with the manual lever 42.

It will be noted that, in this instance, the key 60 is disposed substantially centrally of the tubular portion 62 of the disk 61. The inner surface of the disk 61 forms a part of a slip clutch or over-riding means which also comprises a friction disk 63 adhesively or otherwise secured to disk 61 which is preferably made from cork. The disk 63 is loosely penetrated by the shaft 41 and its surface opposite from the surface thereof which is engaged by the disk 61, movable with manual lever 42, is urged into engagement with a circular or disk portion 65 of an automatic depth control arm 66. The disk portion 65 of the arm 66 is oscillatable on shaft 41 and its inner surface engages the outer surface of hub 42b which may be a portion of the quadrant 42a. This hub portion 42b is suitably secured to the one side wall of the casing 22 of the control unit 23, as heretofore described.

The arm 66 extends downwardly from shaft 41 and has a row of spaced openings or holes 67 therein in any one of which one inturned end of a connecting link 70 may be pivotally mounted, as best shown in Figures 3 and 4. The connecting link 70 extends rearwardly and is pivotally connected to the lower end of a lifting arm extension 71 which extends upwardly in substantially parallel relationship to the arm 66 and is suitably secured to one end of the rocker shaft 21 on which the lifting arms 20 are fixedly mounted.

It will be noted that the friction disk 63 is urged against the disk portion 65 of arm 66 and the disk portion 65 is, in turn, urged against the hub 42b by means of a compression spring 74, which loosely surrounds the outer end of shaft 41 and one end of which engages the lower portion of the manual lever 42 and the other end of which engages a nut 75 threadably mounted on the outer end of shaft 41.

In operation, the operator merely moves the manual lever to a predetermined position intermediate the ends of the quadrant 42, said position corresponding to the depth of cut desired. Thereafter, as the plow or implement 12 subsequently encounters relatively hard or dense soil, which would have a tendency to raise the plow 12, it is merely necessary for the operator to move the manual lever 42 downwardly to compensate for the extra hardness or density of the soil so that a lesser amount of the weight of the implement or plow 12 is supported by the fluid in the cylinder 24. Thus, the added weight of the implement or plow 12 would cause the same to remain at substantially the same depth as it passes through the relatively hard or dense soil, as that depth to which it was originally adjusted while the implement or plow 12 was passing through soil of normal hardness or density. This is the only time that it is necessary for the operator to again adjust the position of the manual lever 42.

As the plow or implement 12 subsequently passes from the relatively hard or dense soil into relatively loose soil, any tendency of the plow to move downwardly, due to its added weight, will be compensated for, since the lifting arms 20 will move downwardly or in a counter-clockwise direction in Figure 4 as the implement or plow 12 tends to move downwardly and, due to the friction disk 63, this tendency of the lifting arms 20 to move in a counter-clockwise direction will cause the lifting arm extension 71, the automatic level control arm 66 and the manual lever 42 to also move in a counter-clockwise direction in Figure 4. Depending upon the hole 67 in the arm 66 in which the front inturned end of the link 70 is positioned, the manual lever 42 will move a substantially greater distance, or through an arc of a substantially greater number of degrees, than the lifting arms 20 and this movement of the manual lever 42 will cause the valve 30 (Figure 6) to momentarily completely open the inlet port 31 to thereby admit fluid into the cylinder 24. This will quickly raise the implement or plow 12 to its optimum position, since the subsequent upward movement of the plow or implement 12 will cause corresponding multiplied movement of the manual lever 42 which, in turn, will quickly close the port 31 and momentarily open the outlet port 32 to again momentarily release some of the fluid or oil from the cylinder 24.

Of course, on the other hand, upon the plow or implement 12 again approaching a relatively hard or dense soil, which would normally cause the implement to be raised, any tendency of the implement to be raised would cause corresponding movement to be imparted to the lifting arms 20 which would, in turn, cause the manual lever 42 to move downwardly to again momentarily open the outlet port while closing the inlet port 31 so the implement would quickly return to its original position.

It is evident that the conventional operating mechanism functions to move the pivot 34, each time the manual lever 42 is moved in either direction by variations in the level of the implement or plow 12, to return the valve 30 to where it closes both of the ports 31 and 32 in the manner heretofore described.

It is thus seen that I have provided an improved depth or level controlled apparatus for the implement or plow 12, which operates in conjunction with the conventional automatic level control apparatus to cause the control apparatus to quickly respond to the slightest variations in the level of the implement as the implement goes too deep or too shallow and as the draft or soil pressure increases or decreases, and which attachment obviates the necessity of the operator continuously moving the manual lever 42 in accordance with variations in the hardness or density of the soil through which the implement or plow 12 is passed. With this improved automatic depth control apparatus, it is only necessary to move the manual lever 42 occasionally where there are extreme variations in the density or hardness of the soil, since normal variations in the soil will merely cause the plow or implement 12 to waver slightly from the desired depth, which wavering would be unnoticeable so that a furrow of uniform depth is formed as the plow or implement 12 passes through the soil.

Throughout the specification the word "plow" has been used, but I desire it to be understood that this term includes any earthworking implements such as disk plows, disk harrows, subsoilers, grading blades, and all types of earthworking means.

In the drawings and specification there has been set forth a preferred embodiment of the invention and, although specific terms are employed, they are used in generic and descriptive sense only, and not for purposes of limitation, the scope of the invention being defined in the claims.

I claim:
1. In a tractor having means for the attachment of an implement including a pair of lifting arms, a power-operated control unit comprising a pump and a device operable by fluid from the pump for imparting movement to said arms and, accordingly, for moving the implement up and down with reference to the tractor, valve means for the device, a manually movable lever for moving said valve means, means operable automatically upon movement of said manually movable lever to a predetermined position for closing said valve means for holding the implement on a predetermined level, and a shaft on which the manually movable lever is fixed and being movable with the manually movable lever for controlling said valve means; the combination of a control arm having a disk portion thereon oscillatable on said shaft, a friction disk engaging said disk portion, means on said manually movable lever for engaging the side of said friction disk opposite from the disk portion on said arm, spring means normally urging the friction disk, the disk portion of said control arm and the means on said manually movable lever in contacting engagement, a lifting arm extension movable with said lifting arms, and a link connecting the free ends of said extension and said control arm whereby said manually movable lever may be moved to a predetermined position for raising or lowering the implement to the required depth of cut and whereby any variations in the level of the implement will automatically effect movement to the manually movable lever for operating said valve means to return the implement to said predetermined position to thereby maintain the implement at a constant depth of cut.

2. A structure according to claim 1 wherein said control arm has a plurality of longitudinally spaced openings therein, and means on the end of said link remote from said lifting arm extension adapted to fit in any one of said openings in the control arm to thereby vary the amount of movement imparted to the manually movable lever with movement of the lifting arm extension in either direction and to thereby vary the sensitivity of the effectiveness of the said valve means in maintaining the implement at a constant depth of cut.

References Cited in the file of this patent

UNITED STATES PATENTS

| | | |
|---|---|---|
| 2,118,180 | Ferguson | May 24, 1938 |
| 2,540,429 | Cordes | Feb. 6, 1951 |
| 2,618,167 | Seifert | Nov. 18, 1952 |